L. M. & M. L. ANDERSON.
COMBINATION FEEDER, FOUNTAIN, AND HEATER.
APPLICATION FILED MAY 11, 1911.
1,023,352.
Patented Apr. 16, 1912.
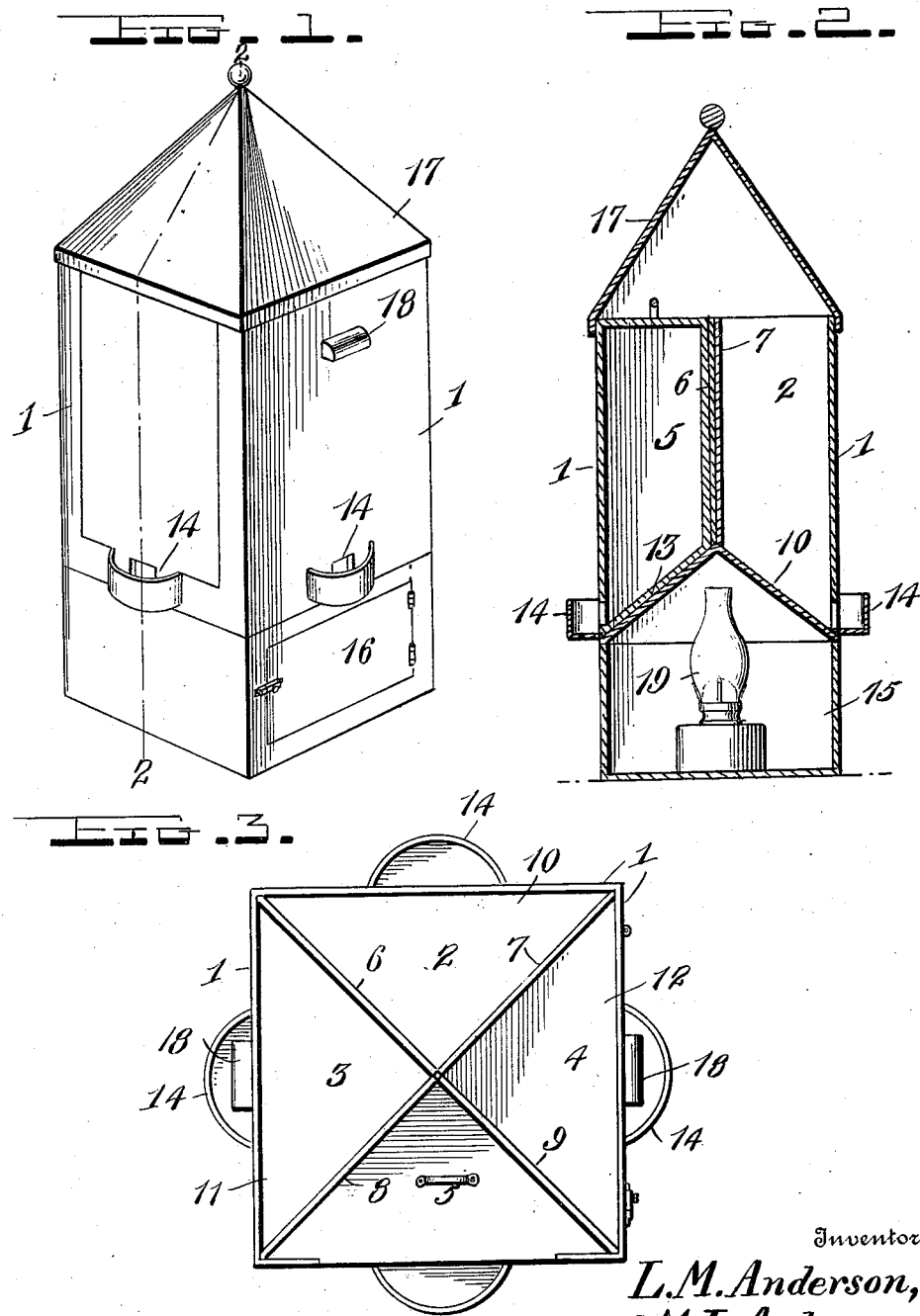

UNITED STATES PATENT OFFICE.

LEO M. ANDERSON AND MAY L. ANDERSON, OF RAMSEY, NEW JERSEY.

COMBINATION FEEDER, FOUNTAIN, AND HEATER.

1,023,352.  Specification of Letters Patent.  Patented Apr. 16, 1912.

Application filed May 11, 1911. Serial No. 626,597.

*To all whom it may concern:*

Be it known that we, LEO M. ANDERSON and MAY L. ANDERSON, citizens of the United States, residing at Ramsey, in the county of Bergen and State of New Jersey, have invented certain new and useful Improvements in Combination Feeders, Fountains, and Heaters, of which the following is a specification, reference being had to the accompanying drawings.

This invention relates to poultry apparatus, and more particularly to a combination feeder, fountain and heater for poultry.

The object of our invention is to provide a device which can be used for feeding poultry with grain, grit, charcoal and water from the same vessel and providing means for heating the same.

Another object of the invention is to provide this apparatus so that it will feed automatically to the feeding cups.

A further object of this invention is to provide means whereby the apparatus can be easily filled with the desired materials or cleaned out.

Other objects of the invention will become apparent as it is more fully set forth.

It is well known to users of poultry apparatus that the heating of the eating material of the poultry forms a more or less complex problem, and, in most cases, it causes considerable inconvenience because of the many separate utensils required, together with the trouble of looking after them.

In this invention, the feeding, drinking, and heating is all taken care of in one utensil so arranged that the heat given off by the heating means will be efficiently used therein.

In the accompanying drawings, which illustrate by way of example an embodiment of our invention, Figure 1 represents a perspective view of a heater, embodying our invention; Fig. 2 is a vertical section along the line 2—2 of Fig. 1; and Fig. 3 is a plan view of the heater shown in Fig. 1, with the cover removed.

Similar reference characters refer to similar parts throughout the drawings.

In the appended drawings, 1 represents the sides of a heater which is preferably of a square cross section. The interior of this heater is divided into four compartments, 2, 3, 4 and 5, by the partitions 6, 7, 8 and 9, respectively, the lower portion of the compartments having floors 10, 11, 12 and 13, which incline from the central portion of the heater downwardly to the outer edges of the compartments. Each of these compartments is provided with a door and cup 14 to receive the water, grit, grain and charcoal from the compartments in amounts suitable to be used by the poultry. The lower portion of the combination device is provided with a compartment 15 to receive a lamp or other heating element directly under the compartments, that is, the floor of the compartments will form the roof of the heating compartment 15.

16 is a door, with suitable locking devices to the compartment 15, in order to provide for inspection, insertion, and removal of the lamp, and for other general purposes.

A cover 17 is provided for the apparatus and arranged so as to be easily and completely removed therefrom.

18 are handles for lifting and transporting the device and 19 is a lamp or other heating element used for heating the grain and other material in the compartments.

In operation, the compartments 2, 3, 4 and 5 are filled with their respective substances, and the cover is put in place. The cups 14 are then filled with a suitable amount of material, which is controlled in any well known manner. The heater or heating element 19 is then placed in its compartment 15 and immediately it warms up the material that is within the chambers. It will be seen that the heating being arranged to take place on the lower portion of the chambers tends to heat the material that will come out first to the cups, which arrangement makes it positive that the portions which the poultry eat are at a desirable temperature. In the case of a lamp, the heat can be easily graduated and, even should it be removed temporarily, the heated water in its respective compartment will tend to keep the other compartments warm for some considerable time. Thus it will be seen that the general arrangement of the apparatus will produce an efficient arrangement, as far as the amount of space taken up is concerned, and also in the amount of heat it uses, together with a reduction in the amount of attention required to take care of the apparatus, over that which would be necessitated, should the materials be in separate utensils. It is, of course, understood that any suitable means can be provided for admitting and relieving the heated air from the compartments, should same be necessary.

While we have shown this device with only four compartments, we anticipate the use of more or less than this number, depending on the requirements to be met with, and we do not wish to be limited in any way, otherwise than necessitated by the prior art, as many modifications in the construction of our invention can be made without departing from the principles thereof.

The chief advantage of this apparatus is that it is automatic in its action, it is convenient in every way, efficient in its use, sanitary, and its cost of manufacture is comparatively low.

As shown in the drawings, a removable tank is provided to contain the water for the compartment 5, and have left the front portion of the latter open as clearly shown in the drawings, the tank being made to fit closely and come flush with the front where the same has been left open. By having a separate water tank the owner may replace an old one for a new one at any time and thus lengthen the useful life of the feeder and heater and increase its sanitary characteristics.

Having thus described the invention what is claimed is:

A combination fountain and heater for poultry, comprising a casing divided into a plurality of vertically elongated compartments meeting at the longitudinal center of the casing and formed with outwardly and downwardly inclined bottoms, the casing being provided with separate cups on its exterior at the bottom of the compartments and with openings leading outwardly into the cups, the casing being further formed with a heating compartment underneath the bottoms of the first named compartments and communicating with all of the said bottoms whereby the heat created in the heating compartment will act equally upon all of the first named compartments, the casing being also formed in one side with a relatively large opening extending to the upper edge of the casing, a water receptacle fitting in said opening and resting on the inclined bottom of one of the first named compartments and formed with an opening leading out into one of the cups, and a detachable cover for the top of the casing, said cover extending over the front of the water receptacle at the top thereof whereby to hold the water receptacle in position.

In testimony whereof we hereunto affix our signature in the presence of two witnesses.

LEO M. ANDERSON.
MAY L. ANDERSON.

Witnesses:
JOHN FRANK DE BAUN,
CHAS. S. McPECK.

Copies of this patent may be obtained for five cents each, by addressing the "Commissioner of Patents, Washington, D. C."